United States Patent
Doron et al.

(10) Patent No.: US 11,405,417 B2
(45) Date of Patent: Aug. 2, 2022

(54) DISTRIBUTED DENIAL OF SERVICE (DDOS) DEFENSE TECHNIQUES FOR APPLICATIONS HOSTED IN CLOUD COMPUTING PLATFORMS

(71) Applicant: RADWARE, LTD., Tel Aviv (IL)

(72) Inventors: Ehud Doron, Moddi'in (IL); Nir Ilani, Givat Brenner (IL); David Aviv, Tel Aviv (IL); Yotam Ben Ezra, Ra'anana (IL); Amit Bismut, Kiryat Motzkin (IL)

(73) Assignee: Radware, Ltd., Tel Aviv (IL)

( * ) Notice: Subject to any disclaimer, the term of this patent is extended or adjusted under 35 U.S.C. 154(b) by 359 days.

(21) Appl. No.: 15/907,905

(22) Filed: Feb. 28, 2018

(65) Prior Publication Data
US 2018/0255095 A1   Sep. 6, 2018

Related U.S. Application Data

(60) Provisional application No. 62/467,534, filed on Mar. 6, 2017.

(51) Int. Cl.
*H04L 29/06* (2006.01)
*H04L 9/40* (2022.01)
*H04L 67/02* (2022.01)

(52) U.S. Cl.
CPC ...... *H04L 63/1458* (2013.01); *H04L 63/0209* (2013.01); *H04L 63/101* (2013.01);
(Continued)

(58) Field of Classification Search
CPC ............... H04L 63/0209; H04L 63/101; H04L 63/1416; H04L 63/1458
See application file for complete search history.

(56) References Cited

U.S. PATENT DOCUMENTS 8,100,039 B2   1/2012 Gass
8,613,089 B1 * 12/2013 Holloway ........... H04L 63/0281
726/23
(Continued)

OTHER PUBLICATIONS

John E. Dickerson, Fuzzy Network Profiling for Intrusion Dedection, Feb. 2000, IEEE Xplore, DOI: 10.1109/NAFIPS.2000.877441 (Year: 2000).*

*Primary Examiner* — Jeffrey C Pwu
*Assistant Examiner* — Thong P Truong
(74) *Attorney, Agent, or Firm* — M&B IP Analysts, LLC

(57) ABSTRACT

A defense platform for protecting a cloud-hosted application against distributed denial-of-services (DDoS) attacks, wherein the defense platform is deployed out-of-path of incoming traffic of the cloud-hosted application hosted in a plurality of cloud computing platforms, comprising: a detector; a mitigator; and a controller communicatively connected to the detector and the mitigator; wherein the detector is configured to: receive telemetries related to behavior of the cloud-hosted application from sources deployed in the plurality of cloud computing platforms; and detect, based on the telemetries, a potential DDoS attack; wherein, the controller, upon detection of a potential DDoS attack, is configured to: divert traffic directed to the cloud-hosted application to the mitigator; cause the mitigator to perform at least one mitigation action to remove malicious traffic from the diverted traffic; and cause injection of clean traffic to at least one of the plurality of cloud computing platforms hosting the cloud-hosted application.

27 Claims, 6 Drawing Sheets

(52) U.S. Cl.
CPC ...... *H04L 63/1416* (2013.01); *H04L 63/1425* (2013.01); *H04L 63/20* (2013.01); *H04L 67/02* (2013.01); *H04L 2463/141* (2013.01)

(56) References Cited

U.S. PATENT DOCUMENTS

| | | |
|---|---|---|
| 8,739,244 B1 | 5/2014 | Wu et al. |
| 8,843,645 B2 | 9/2014 | Annamalaisami et al. |
| 9,462,010 B1 | 10/2016 | Stevenson |
| 9,729,414 B1 * | 8/2017 | Oliveira ................ H04L 41/042 |
| 2011/0010463 A1 * | 1/2011 | Christenson ...... H04L 29/12066 |
| | | 709/245 |
| 2012/0124666 A1 | 5/2012 | Kim et al. |
| 2012/0216282 A1 | 8/2012 | Pappu et al. |
| 2012/0272289 A1 | 10/2012 | Chang et al. |
| 2012/0324573 A1 | 12/2012 | Kim et al. |
| 2013/0055375 A1 | 2/2013 | Cline et al. |
| 2013/0333029 A1 | 12/2013 | Chesla et al. |
| 2014/0109225 A1 | 4/2014 | Holloway et al. |
| 2014/0157405 A1 | 6/2014 | Joll et al. |
| 2014/0215621 A1 * | 7/2014 | Xaypanya ............. H04L 63/145 |
| | | 726/23 |
| 2014/0283051 A1 * | 9/2014 | Doron ................ H04L 63/1458 |
| | | 726/23 |
| 2014/0304817 A1 | 10/2014 | Kim et al. |
| 2014/0331304 A1 * | 11/2014 | Wong .................... H04L 63/101 |
| | | 726/11 |
| 2016/0127408 A1 | 5/2016 | Miu et al. |
| 2016/0359861 A1 | 12/2016 | Manov et al. |

\* cited by examiner

DISTRIBUTED DENIAL OF SERVICE (DDOS) DEFENSE TECHNIQUES FOR APPLICATIONS HOSTED IN CLOUD COMPUTING PLATFORMS

CROSS-REFERENCE TO RELATED APPLICATIONS

This application claims the benefit of U.S. Provisional Application No. 62/467,534 filed on Mar. 6, 2017, the contents of which are hereby incorporated by reference.

TECHNICAL FIELD

This disclosure relates generally to cyber-security systems and, more specifically, to techniques for defending against distributed denial of service (DDoS) attacks in cloud computing platforms.

BACKGROUND

With the rapid adoption of use of computers in modern society, computer systems have become increasingly subject to cyber-attacks intended to disrupt the systems, steal data, cause application defacement, manipulate their behavior, or a combination of these. Accordingly, the field of cyber security has developed to combat such cyber-attacks. Cyber security is particularly important in cloud computing platforms, where multiple computer resources interact remotely in order to provide the required services, e.g., sharing of files and applications. Organizations have increasingly adapted their applications to cloud computing platforms, either completely or via hybrid implementations (i.e., such that one part of the application is implemented on premises of an enterprise data center and another part of the application is hosted in one or more public clouds). This makes defending public cloud-hosted applications much more complex, as the applications may be hosted in multiple public cloud computing platforms.

Some leading public cloud service providers include Amazon®, Microsoft®, Google®, Oracle®, Hewlett-Packard®, and so on. To ensure their services are not interrupted, these service providers must offer security protection services to their customers against cyber security threats.

Existing solutions for mitigating cyber security threats also include on-premises techniques for protecting particular resources. As cloud computing platforms have been increasingly adopted, cloud-based cyber security protection services have also been developed to protect cloud computing platforms including various computing resources. Such security protection services may be provided by the cloud service providers, but cannot protect assets deployed in a hybrid infrastructure, in other public cloud platforms, or on premises of an organization.

As more organizations migrate to the cloud, attackers have begun targeting cloud computing platforms and applications hosted therein more frequently as evidenced by an increasing number of attacks directed to cloud computing assets. Further, to provide more advanced attacks, attackers have begun combining multiple cyber security threat techniques into a single attack, thereby increasing the likelihood of bypassing any defenses. Moreover, cyber security requirements are becoming even more rigorous as attacks become more sophisticated, more vicious, longer lasting, in higher volumes, and higher velocity.

Recently, some services have been developed to provide new security defense services to protect cloud applications. However, such services are limited in their capabilities mainly since they are designed to protect cloud applications residing only in specific platforms. For example, Amazon® now offers security services to cloud applications that are only hosted in an Amazon cloud via the Amazon Web Services® platform. This is a limiting factor, as cloud applications of a specific tenant (customer) can be executed partially on-premises and/or in multiple cloud platforms.

Therefore, even when an optimal defense service is available to a cloud service provider, the defense service is limited to one platform and cannot provide protection across platforms. For example, a cloud application can run in an on-premises datacenter and in an Amazon® cloud, but currently there is no security service provided by a cloud service provider that can protect such a hybrid execution of a cloud computer.

Another existing solution provides detection for application layer attacks using in-line security systems provisioned as part of the cloud service. For example, conventional virtual systems attempt to profile all incoming traffic of a protected web server to detect abnormal activity. However, such solutions can operate only as an in-line deployment and not in out-of-path deployments, mainly due to the inability to gain layer-7 telemetry required for such deployments.

For the inline mitigation device, disadvantages may include that the virtual device is intrusive in cloud computing platforms, that service down time occurs when the device fails, that the device can be costly in terms of both the cost of the device itself and the cost of cloud resources used for implementing, or hosting, the device, that the device introduces latency into the service, and that the device requires building elastic services to be deployed. For protection services offered by public cloud vendors, disadvantages may include that the services are only configured for use in the vendor's infrastructure and, accordingly, provide challenges to organizations seeking to utilize a single unified solution to protect all of their assets whether deployed in multiple cloud computing platforms and/or partially on premises.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a defense platform for protecting a cloud-hosted application against distributed denial-of-services (DDoS) attacks, wherein the defense platform is deployed out-of-path of incoming traffic of the cloud-hosted application, wherein the cloud-hosted application is hosted in a plurality of cloud computing platforms, comprising: a detector; a mitigator; and a controller communicatively connected to the detector and the mitigator; wherein the detector is configured to: receive telemetries from a plurality of sources deployed in the plurality of cloud computing platforms, wherein the collected telemetries related to behavior of the cloud-hosted application; and detect, based on the collected telemetries, a potential DDoS attack against the cloud-hosted application; wherein, the controller, upon detection of a potential DDoS attack against the cloud-hosted application, is configured to: divert traffic directed to the cloud-hosted application to the mitigator; cause the mitigator to perform at least one mitigation action to remove malicious traffic from the diverted traffic; and cause injection of clean traffic to at least one of the plurality of cloud computing platforms hosting the cloud-hosted application.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1:
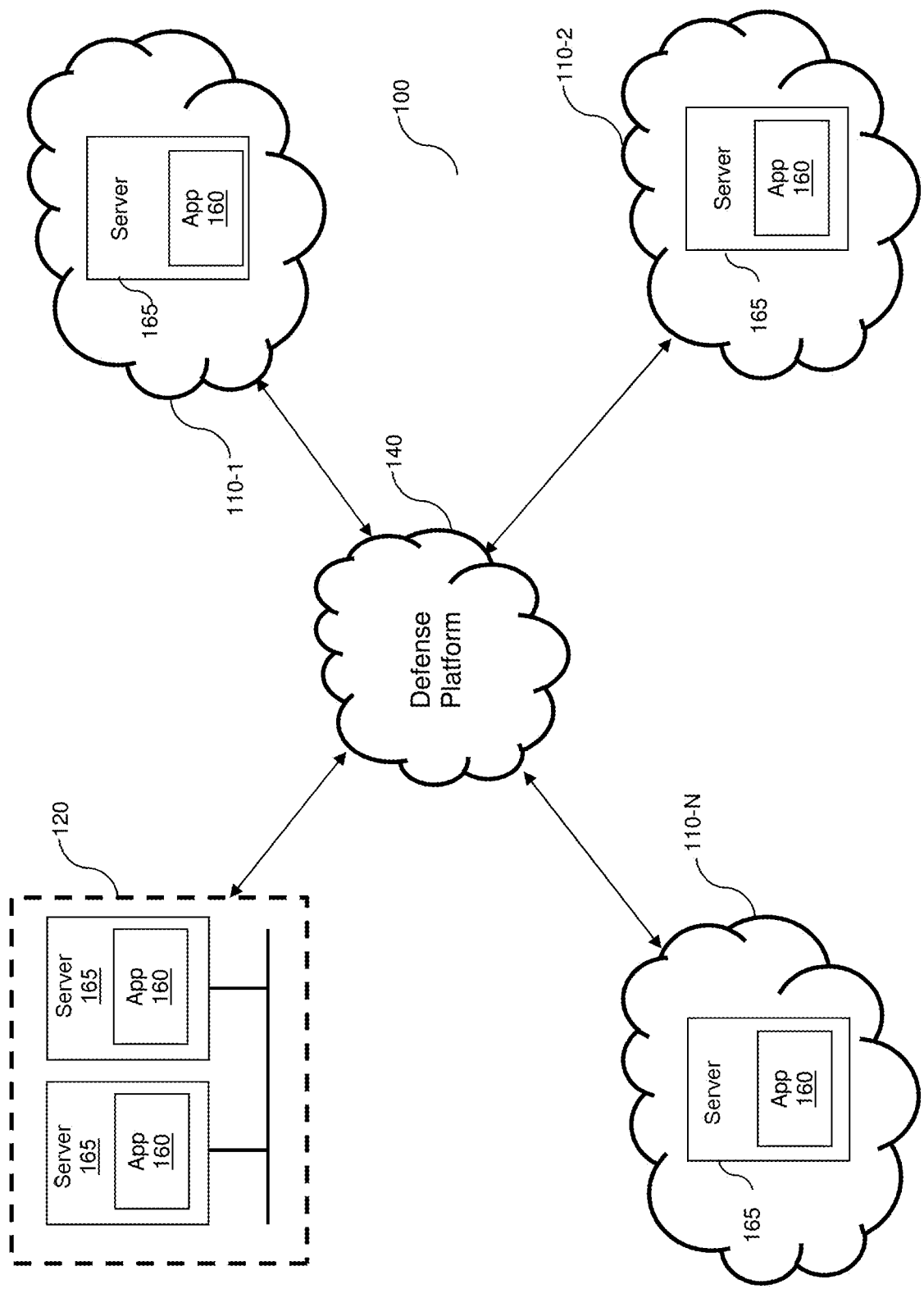
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for out-of-path cyber defense. The disclosed embodiments may be utilized to prevent or mitigate cyber security threats for applications that are hosted in multiple public, or other, cloud platforms. The protected applications hosted in different cloud platforms may belong to, be operated by, be associated with, or otherwise related to a single tenant (organization). Various embodiments disclosed herein may be utilized for detecting and mitigating denial of service (DoS) or distributed denial of service (DDoS) attacks (hereinafter referred to collectively as "DDoS attacks", merely for simplicity purposes). The DDoS attacks may be attacks directed at network layers, for example layer-3 (L3) attacks, layer-4 (L4) attacks, or layer-7 (L7) attacks including attack types such as HTTP/TCP Flood, Low and Slow HTTP, malformed HTTP, and the like.

In an embodiment, telemetries are received at a detector deployed out-of-path of traffic to and from protected applications belonging to a tenant. The telemetries may be received from at least one monitoring device configured at least to monitor traffic to and from servers (e.g., servers located at public or other cloud platforms), networks, datacenters, or a combination thereof, hosting the protected applications. The received telemetries are monitored or otherwise investigated to detect potential DDoS anomalies and attacks. Upon detection of a potential DDoS attack, the traffic associated with the attack is mitigated, for example via redirection to a mitigation resource such as, e.g., a on the cloud scrubbing center. The clean traffic is returned to the origin application(s) at the original cloud computing platform.

The disclosed embodiments allow for protecting a hybrid-execution of a cloud application, i.e., a cloud application being executed in a multiple-cloud and on premises of the architecture as illustrated in FIG. 1.

FIG. 1 is an example network diagram of a multi-cloud architecture 100 utilized to describe the various disclosed embodiments. The multi-cloud architecture 100 includes a plurality of cloud computing platforms 110-1 through 110-N (where N is an integer greater than 1), a datacenter 120, and a defense platform 140. Each of the cloud computing platforms 110-1 through 110-N (hereinafter referred to individually as a cloud computing platform 110 and collectively as cloud computing platforms 110, merely for simplicity purposes) may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, HP® Cloud, and the like. In an embodiment, the cloud computing platform 110 may serve as infrastructure-as-a-service (IaaS), Platform-as-a-Service (PaaS), Function as a Service (FaaS), or a combination thereof. The datacenter 120 may be an on-premises datacenter. It should be noted that embodiments disclosed herein can support multiple datacenters and cloud computing platforms from different providers.

Each of the cloud computing platforms 110-1 through 110-N and the datacenter 120 executes a protected application 160, which is the protected entity. The protected application 160 may be provisioned on a single cloud, or in combination between on premises and multiple clouds. As noted above, a protected application 160 may be a web application, a cloud hosted application, or any other software application or software resource executed by a server. Examples of a protected application 160 may include an email service, an e-commerce application, a financial application, a mobile application, an Internet of Things (IoT) application, a storage service, a content streaming service, a company Website, or any other service or application that can be accessed by a web browser (not shown).

The protected applications 160 may be associated with the same tenant (customer). Typically, the execution of each protected application 160 is performed by one or more servers (collectively shown as servers 165). Each server 165 may be a virtual machine or a physical machine or a container. A virtual machine or a container may include any virtual environment for executing code or applications.

The protection of the cloud application 160 hosted in the multi-cloud architecture 100 against DDoS attacks is performed via the defense platform 140. In an example implementation, the defense platform 140 is a cloud computing platform managed by a cloud security vendor (or security service provider) that is not one of the service providers of the protected cloud computing platforms 110.

In an embodiment, the defense platform 140 is configured to collect or receive telemetries from, for example, cloud monitoring systems (not shown in FIG. 1) deployed in each of the clouds 110 and in the data center 120. Based on the received telemetries, a detector (not shown in FIG. 1) is configured to detect potential DDoS attacks in the monitored traffic. In an embodiment, the data center 120 may be protected by an in-line detection and mitigation device (not shown in FIG. 1).

When a potential DDoS attack is detected, the traffic is redirected to the defense platform 140. In an example embodiment, the redirection is performed through a DNS configuration as discussed below in an automated fashion, i.e., without requiring a user to reconfigure the DNS entry. In some configurations, the redirection can be triggered by a user.

In an optional embodiment, when an attack ends, following a predefined cool-down period set to eliminate attack diversion flipping, the traffic diversion is stopped, and traffic resumes being sent to the destination protected application 160 as it would regularly. This eliminates unnecessary latency and waste of mitigation resources throughout the solution lifecycle.

It should be noted that the example implementation shown in FIG. 1 is described with respect to the protected applications 160 hosted in the cloud computing platforms 110 and a single protected data center 120, merely for simplicity purposes and without limitation on the disclosed embodiments. Applications deployed in more or fewer cloud computing platforms, data centers, or both, may be protected without departing from the scope of the disclosure. It should be further noted that the disclosed embodiments can operate in multiple-cloud architectures including only two cloud computing platforms or a single cloud computing platform and a datacenter. That is, the protected cloud application 160 can be hosted and executed in one or more different and exclusive-mutual platforms.

It should be noted that two or more defense platforms 140 can be utilized and deployed in the multi-cloud architecture 100 without departing from the scope of the disclosure. All the entities part of the multi-cloud architecture 100 can communicate through various data network such as the global Internet, by dedicated tunnels or any other communication network, and the like.

Figure 2:
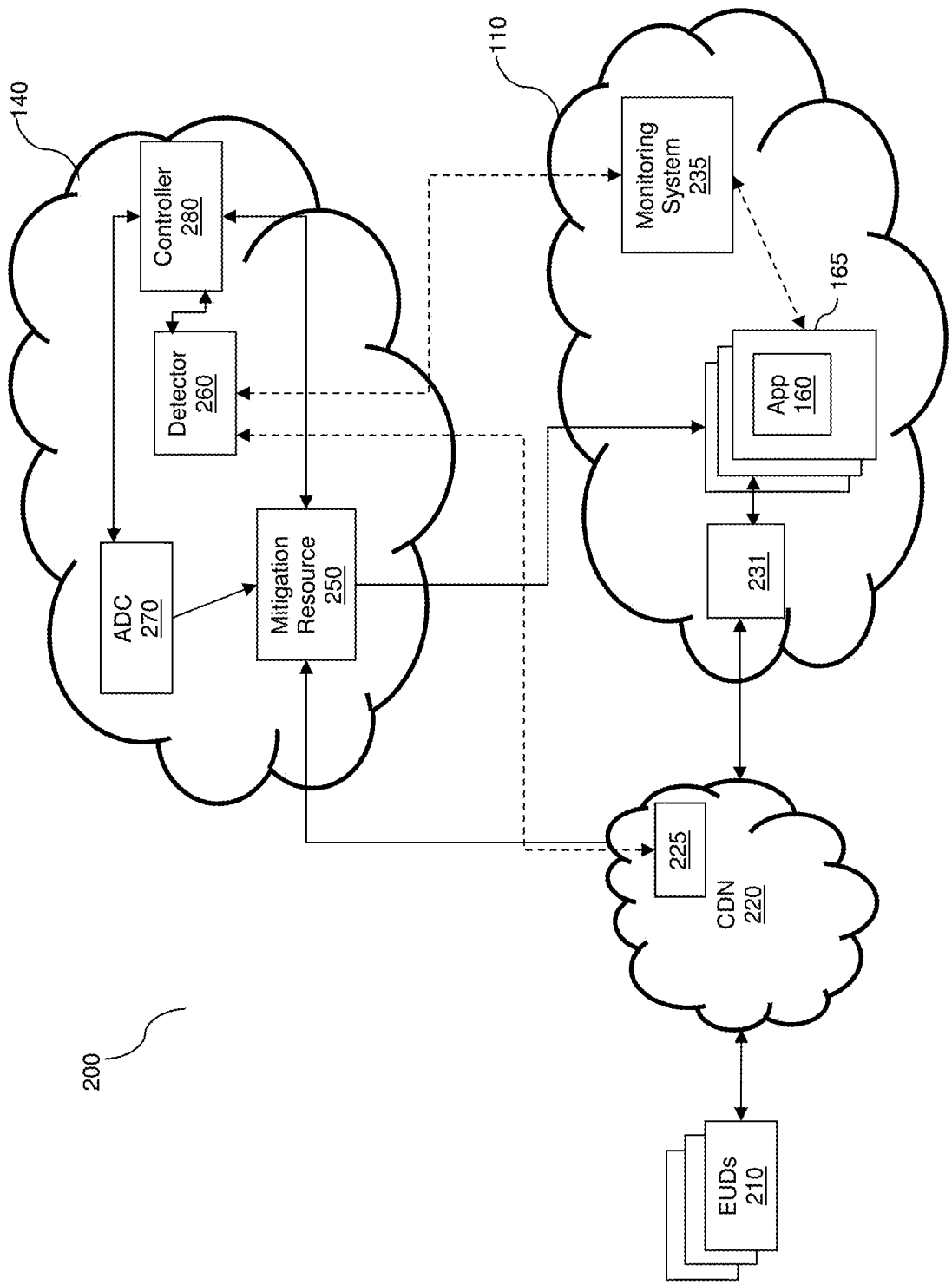
FIG. 2 is a network diagram illustrating deployment of a defense platform according to various disclosed embodiments.

FIG. 2 shows an example network diagram 200 utilized to describe the arrangement and operation of the defense platform 140 according to various disclosed embodiments. The example network diagram 200 illustrates a plurality of end-user devices (EUDs) 210, a content delivery network (CDN) 220, a cloud computing platform 110, and the defense platform 140.

The defense platform 140 includes a mitigation resource (also known as a mitigator) 250, a detector 260, and a controller 280. It should be noted that the defense platform 140 is separate from the cloud computing platform 110. In other optional deployments, the defense platform 140 can be hosted as another tenant of the cloud computing platform 110 or another cloud platform. The other cloud platform may be of a different type, may be operated by a different cloud service provider, or both.

In some configurations, the defense platform 140 includes an application delivery controller (ADC) 270. The ADC 270 is configured, among other tasks, to inject clean traffic provided by the mitigation resource 250 back to the cloud computing platform 110. The ADC 270 may also perform, among other things, load balancing of traffic directed to the mitigation resource 250. The ADC 270 is also configured to perform various IP address translations, such as network address translation (NAT), ensuring that return traffic from the protected application back to the EUDs 210 is also routed through the defense platform 140.

The EUDs 210 are clients configured to access a protected application (App) 160 hosted in the cloud computing platform 110 and executed by the servers 165. The access to the protected application 160 is through a network, such as the Internet, for example by means of a web browser or web application and the like installed on a EUD 210. Each of the EUDs 210 may be, but is not limited to, a personal computer, a laptop, a tablet computer, a smartphone, a smart TV, an IoT device, a wearable computing device, or any other device capable of sending and receiving application data. The protected application 160 may be, but is not limited to, an email service, an e-commerce application, a financial application, a storage service, a content streaming service, a company Website, and the like.

In an optional deployment, the CDN 220 may be communicatively connected between the EUDs 210 and the cloud computing platform 110. The CDN 220 is a system of distributed servers (a network) that deliver webpages and other Web content to a user based on the geographic locations of the user, the origin of the webpage, a content delivery server, and content age and type (static or dynamic).

It should be noted that the EUDs 210, the CDN 220, and the platforms 110 and 140 are all communicatively connected through the Internet, dedicated tunnels or any other communication network. The CDN 220 services can be delivered by the cloud computing platform 110 providers, or by other third-party service providers.

The cloud computing platform 110 may be one of the cloud computing platforms 110-1 through 110-N, or the datacenter 120, discussed in FIG. 1. Each cloud computing platform 110 typically includes an edge entity 231 is, for example, a load balancer configured to perform load balancing on the load among the plurality of servers 165.

The cloud computing platform 110 further includes a monitoring system 235 configured to collect telemetries related at least to attributes of traffic coming in to the cloud computing platform 110, going out of the cloud computing platform 110, or both. The monitoring system 235 may further collect other telemetries related to, e.g., utilization of computing resources (e.g., CPU and memory), load balancing web transactions counts and sizes, HTTP response codes metrics, number of requests, number of errors, number of TCP connections, and the like. In another implementation (not shown), the monitoring system 235 may be further communicatively connected to the CDN 220 to allow for, e.g., receiving monitoring data (or telemetry) from the CDN 220. It should be noted that multiple instances of monitoring systems may be distributed in the cloud computing platform 110 without departing from the scope of the disclosure.

In an embodiment, the detector 260 in the defense platform 140 is configured to receive or otherwise collect telemetries, alerts, and logs, or a combination thereof, that are related at least to traffic between the end user devices 210 and the protected applications 160, from any reliable source regardless of its deployment. Example sources from which telemetries may be received include, but are not limited to, cloud monitoring platforms, application performance monitoring (APM) systems, sources of generic OS level telemetries, and the like. In a further embodiment, the detector 260 is configured to receive or collect telemetries from the monitoring system 235, a monitoring system 225 included in the CDN 220, or both. In yet a further embodiment, the detector 260 interfaces with the monitoring system 235 via an application programming interface (API).

The telemetries may be received continuously, at regular intervals (e.g., once per minute), and the like. The telemetries may be related to, but are not limited to, latency, TCP connections count (new and current connections), a TCP connections size, a HTTP sessions size (in bytes or packets per second), layer-7 HTTP methods or verbs count, other request counts, transaction volume, error rate, combinations thereof, and the like. The telemetries may also include L3 and L4 telemetries such as, but not limited to, byte and packet counts for TCP, UDP, ICMP other IP traffic; SYN packet counts; and the like. The telemetries may be predefined by one or more operators or owners of the cloud computing platform 110.

In an embodiment, the detector 260 is configured to operate as an application layer (layer-7) attack detector by analyzing telemetries related at least to incoming and outgoing traffic flows in order to detect layer-7 (L7) DDoS attacks such as, for example, flood HTTP and TCP DDoS attacks, low and slow DDoS attacks, DNS attacks and the like. Such analysis is based on the detection of abnormalities in the traffic flows as a deviation from normal applicative behavior. It should be noted that different types of L7 DDoS attacks may be detected based on different telemetries such as, but not limited to, an average number of active connections, an average number of packets received per second, number of L7 (DNS, HTTP, HTTPS and so on) requests, and so on. Example techniques for detecting L7 attacks are described further in co-pending U.S. patent application Ser. Nos. 15/657,499 and 15/685,484, assigned to the common assignee, the contents of which are hereby incorporated by reference.

In another embodiment, the detector 260 is configured to operate as an infrastructure layer detector to detect layer-3 (L3) and layer-4 (L4) attacks such as, for example, SYN floods, User Datagram Protocol (UDP) floods, Internet Control Message Protocol (ICMP) attacks, and the like. It should be noted that different types of L3 or L4 DDoS attacks may be detected based on different telemetries such as, but not limited to, a number of packets and bytes of TCP, UDP, ICMP, rest of IP traffic, number of SYN packets, and so on. Example techniques for detecting L3-L4 attacks are described further in co-pending U.S. patent application Ser. No. 15/483,398, the contents of which are hereby incorporated by reference.

In an embodiment, the detector 260 is also configured to implement at least one detection engine (not shown in FIG. 2) to such attacks based on the received telemetries and features extracted therefrom. The detection engine may be configured to monitor the received telemetries, determine and extract a set of L3-L4 or L7 features, and to detect DDoS attacks or anomalies using, for example, a fuzzy logic mechanism, a machine learning based classifier, and the like. A feature is an individual measurable property of a phenomenon being observed. For example, a feature can be a number of HTTP requests per second.

In an embodiment, the detector 260 can implement anomaly detection using a single dimension detection, multiple dimension detection, or a combination thereof. The single or multiple dimension detection may be based on features related to rate variant and invariant-based detection of various telemetries received in real-time.

A single dimension detection may include comparing a single feature's real time values to a learned normal baseline level. In an example implementation, the normal baseline level is determined using the monitored telemetries and may represent an average or otherwise normal typical value for the telemetries and the thresholds may represent deviations from the baseline (e.g., based on a predetermined number of standard deviations from the baseline or as a percentage from the baseline, or as a predefined static value).

The multiple dimension detection can be performed using fuzzy logic inference system (FIS) engines to evaluate various features based on their degree of attacks. Specifically, each feature is evaluated by a FIS engine (shown in FIG. 4) that evaluates a degree of fulfilment (DoF) score of each feature. The various DoF scores are further evaluated by an expert system that determines the degree of attack. Example implementations for fuzzy logic engines for detecting traffic attributes related to DDoS and DoS can be found in U.S. Pat. Nos. 7,681,235 and 7,836,496, assigned to the common assignee, the contents of which are hereby incorporated by reference.

Figure 6:
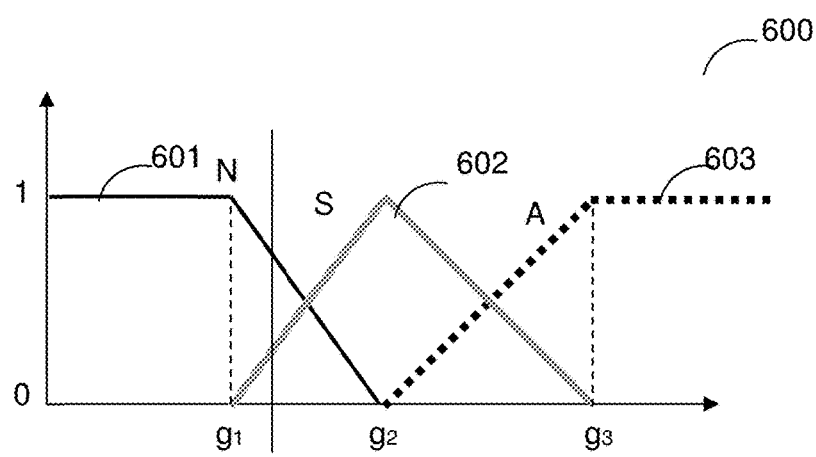
FIG. 6 is a simulation illustrating a multiple-dimension detection by a fuzzy logic inference system engine.

As demonstrated in FIG. 6, a FIS engine 600 uses input membership functions for fuzzy analysis for a single feature. In the example shown in FIG. 6, the function 601 is a non-attack membership function, the function 602 is a potential attack membership function, and the function 603 is an attack membership function. The membership functions 601, 602, and 603 determine a deterministic score, which is a degree of fulfilment (DoF) of the specific feature. The DoF score defines a behavior group (Attack, Suspicious, Normal) that a set of observed features belong to. The DoF scores are evaluated based on certain "breaking points". Such breaking points are shown as $g_1$ for function 601, $g_2$ for function 602, and $g_3$ for function 603.

The values $g_1$, $g_2$, and $g_3$ are dynamically and adaptively computed based on the received telemetries. For example, any of the values $g_1$, $g_2$, and $g_3$ can be set based on one or more learned baselines. Such baselines may be computed based on moving average telemetries received on the above-mentioned features during a specified time period, such as the last day, week, or month, on an hourly basis. In another embodiment, any of the values $g_1$, $g_2$, and $g_3$ can be computed based on normalized variance of the incoming data (traffic parameters of the defined feature) and the current baseline levels. Examples for computing the baseline levels are discussed in U.S. patent application Ser. No. 15/483,398, assigned to the common assignee, which is hereby incorporated by reference.

According to one embodiment, the FIS engine can be configured to evaluate (fuzzification) each of the features noted above using the appropriate adapted membership function. The result of the evaluation is a DoF score for each feature. The DoF score is scaled to a value between 0 and 1.

In an embodiment, for each moment in time, every graph of a membership function provides three degrees of fulfillment (DoF) scores: DoF for Normal, DoF for Suspicious, and DoF for Attack. The DoF score may be computed as follows: given a graph for a feature and the current value of the feature, a vertical line corresponding to the X coordinate of the feature may be "plotted." As an example, such a computation may result in $DoF^N=0.66$, $DoF^S=0.34$, $DoF^A=0$.

In an embodiment, the FIS engine 600 can be realized through implementation of adaptive algorithms, thereby allowing each detection engine to be continually tuned to fit characteristics of the applicative traffic behavior, i.e., behavior relates to the application. Such adaptive algorithms may include, for example, Infinite Impulse Response (IIR) filters, which continually compute a baseline based on the traffic parameters (e.g., rates of HTTP requests, responses, or both) and modify fuzzy logic breaking points membership functions accordingly. The use of fuzziness for representing the quantitative features monitored for detection of DDoS attacks generally eliminates the abrupt separation of abnormality from normality, providing a measure of the degree of abnormality or normality of a given feature. It should be appreciated that the fuzzy logic techniques allow for automatic detection and then mitigation of attacks, and thus eliminates the need for manual protection policy refinements. Using predefined polices does not provide optimal defense against known and emerging threats.

Example implementation of fuzzy logic engines for detecting traffic attributes related to DDoS and DoS can be found in U.S. Pat. Nos. 7,681,235 and 7,836,496, assigned to the common assignee, which are hereby incorporated by reference.

Returning to FIG. 2, in an embodiment, the mitigation resource 250 is communicatively connected to the ADC 270. Upon detection of a potential attack, the controller 280 may be configured to cause a DNS diversion from a normal path of traffic from the EUDs 210 to the mitigation resources 250. That is, when the DNS diversion has occurred, instead of flowing to the protected application 160, traffic from the EUDs 210 is diverted to the defense platform 140.

In an embodiment, the DNS diversion may include updating a CNAME record of each protected application 160 to cause redirection of traffic to the defense platform 140. To this end, the controller 280 may be configured to dynamically, and automatically, change the DNS records of the protected application 160 at its authoritative DNS service, such that any DNS resolving operation, by any edge entity 231, to resolve the fully qualified domain name (FQDN) of the protected application 160 is replied with the IP addresses of the defense platform 140. When the DNS is operated by the owner of the cloud computing platform 110, DNS credentials may need to be obtained from the cloud computing platform 110.

The controller 280 is configured to control the traffic diversion to and from the platforms 110 and 140 as well all of the mitigation functionalities. Specifically, in an embodiment, upon detection of a potential attack, the controller 280 is configured to signal a detected attack to the mitigation resource 250. The controller 280 is further configured to cause DNS traffic redirection from the EUDs 210 to the defense platform 140 and, in particular, to the mitigation resource 250. In another embodiment, the controller 280 may be configured to implement border gateway protocol (BGP) to redirect traffic. To this end, the controller 280 may be configured to dynamically announce BGP updates to relevant routers (not shown).

The mitigation resource 250 is configured to clean the traffic by executing one or more mitigation actions, and to send the clean traffic directly to the servers 165 for use by the protected application 160. Alternatively, the mitigation resource 250 forwards legitimate clean traffic back toward the protected application 160 through the ADC 270. That is, the ADC 270 is configured to send clean traffic to the servers 165 (FIG. 1). In some embodiments, the mitigation resource 250 may be, but is not limited to, an "on the cloud" scrubbing center.

In some implementations, the IP addresses of assets in the cloud computing platform are not constant (for example, if the IP address is changed by a cloud provider during operation). To this end, in an embodiment, the controller 280 may be configured to configure the ADC 270 to issue periodic DNS queries to dynamically learn and update the IP address of the asset to which cleaned traffic should be returned, thereby ensuring that cleaned traffic is returned to an appropriate address. Alternatively, the controller 280 may be configured to perform other methods for dynamic DNS redirection.

In an embodiment, traffic is diverted via DNS traffic redirection. The DNS traffic redirection includes automatically modifying an authoritative DNS record entry to point to a virtual IP (VIP), or other, address representing a mitigation resource in the defense platform 140 and not to an IP address of the requested domain hosted in the cloud computing platform 110 and use in peace, or no attack, times. For example, a request to a protected domain "www.mysite.com" would be replaced with "po.mysite.clouddetectorner, where such a fully qualified domain name (FQDN) is identified by a different domain name.

To mitigate DDoS attacks directed to the cloud computing platform 110, in an embodiment, the cloud computing platform 110 may be configured with a dedicated access control list (ACL). To this end, routers, or other elements like FW and as such, in the cloud computing platform 110 may be configured with access permissions blocking traffic from any source IP addresses other than IP addresses of components of the defense platform 140 (e.g., addresses within a predetermined range) or whitelisted addresses for the cloud computing platform 110.

In an embodiment, the mitigation resource 250 may be configured to determine when a previously detected DDoS attack is terminated. Upon such determination, the controller 280 returns to a peace mode of operation, i.e., DNS traffic redirection is terminated and the DNS operation is returned to its original operation such that traffic is directed from EUDs 210 directly to their original destination server 165 located at the cloud computing platform 110. In implementations in which the cloud computing platform 110 is configured with an ACL when the attack is detected, returning to the peace mode may include removing the ACL and releasing mitigation resources from traffic cleaning, thereby concluding traffic redirection.

It should be noted that a single defense platform 140 and a single mitigation resource 250 are shown in FIG. 2 merely for simplicity purposes and without limitation on the disclosed embodiments. In some deployments, multiple defense platforms, each including one or more mitigation resources can be utilized. Such deployments allow for elastic scalability, redundancy, locality, and high availability. Further, as demonstrated in FIG. 1, the disclosed embodiments may be utilized to use similar means to detect cyber-attacks and mitigate traffic related to multiple cloud computing platforms from multiple public cloud vendors, multiple data centers, or both.

It should be noted that, while the detector 260 is employed using these features, it will not falsely detect a legitimate high-volume of legitimate application traffic as an attack (a flash crowd). For example, during a sales event on an e-commerce website, the RPS (request rate) may increase, but the ARS, average request size, remains the same.

Figure 3:
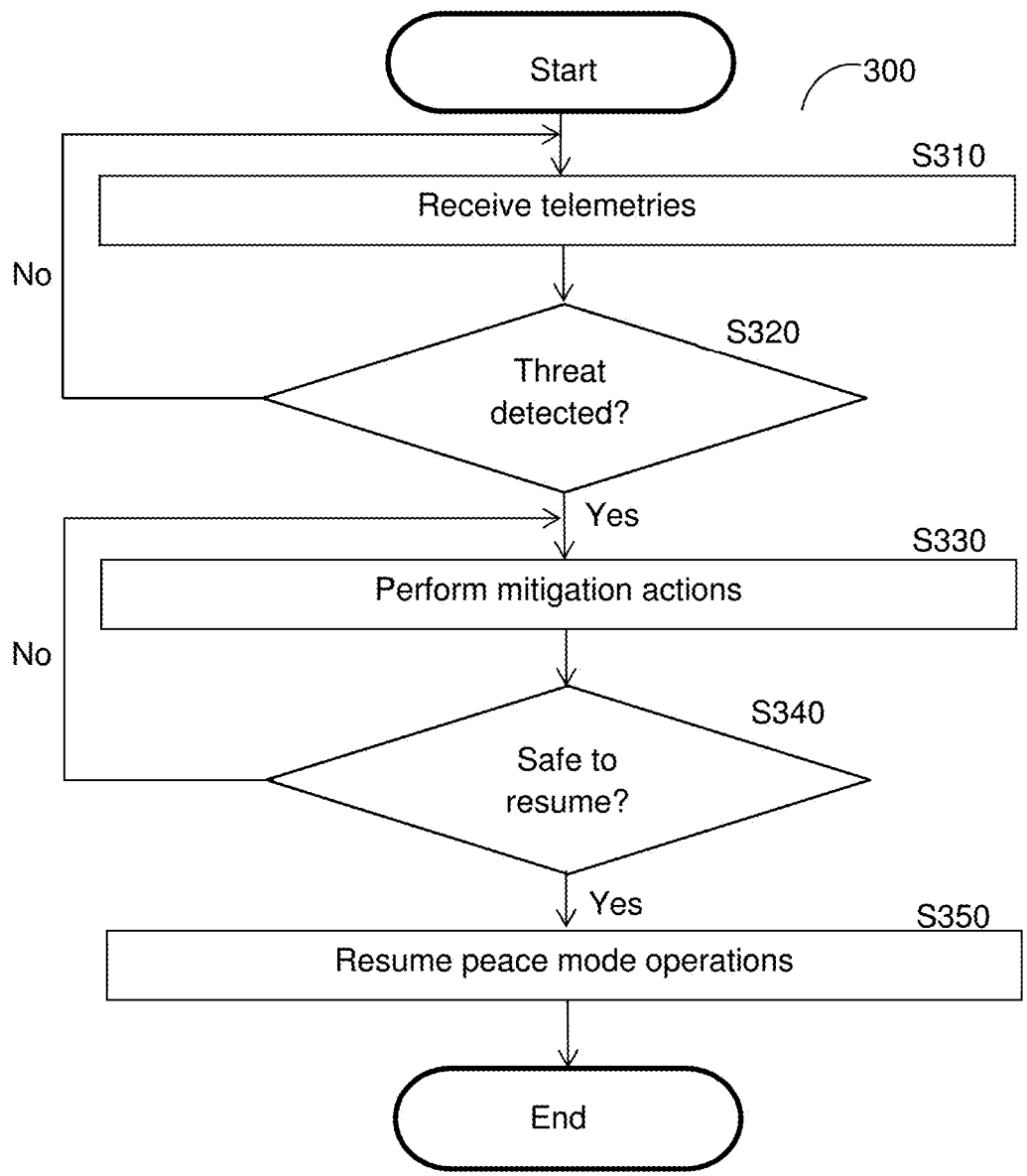
FIG. 3 is a flowchart illustrating a method for out-of-path cyber defense according to an embodiment.

FIG. 3 is an example flowchart 300 illustrating a method for out-of-path (OOP) defense of at least one protected cloud application hosted in a multi-cloud architecture according to an embodiment. In an embodiment, the method may be performed by a defense platform 140 including at least a detector 160, one or more mitigation resources 250, and a controller 280.

At S310, telemetries are received at a detector located out-of-path with respect to the protected applications. The telemetries may be received as L3 to L7 telemetries from a plurality of monitoring systems deployed in a plurality of public clouds, on-premises locations, or both, where each monitoring system is configured to monitor at least traffic related to the at least one protected application. The telemetries are received continuously, at predetermined time intervals (e.g., once every minute), and the like.

In an embodiment, telemetries include data on at least a total number of concurrently active TCP connections; a total number of new TCP connections; and a total number of bytes processed by an edge entity in the cloud platform.

In an embodiment, the telemetries are aggregated per protected application. Such applications can be executed in different cloud computing platforms, data centers, or both. Thus, the received telemetries can be sourced and aggregated from different resources and, in particular, where at least some of the resources are not on-premises of the defense platform 140. Accordingly, the security service provider operating the defense platform 140 may protect applications hosted in multiple cloud computing platforms or at least partially on-premises and partially in cloud computing platforms.

At S320, the received telemetries are continuously processed to detect a potential DDoS attack. The actual detection processing is performed periodically after each new period of telemetry collection is accomplished. Examples for such attacks are provided herein above. Upon detection of an attack, execution continues with S330; otherwise, execution continues with S310. The detection may include, but is not limited to, comparing each received telemetric to one or more thresholds. The thresholds are learned baselines.

In an embodiment, S320 includes processing the received telemetries to extract features. The extracted features are evaluated by FIS engines. The FIS engines provide DoF scores to an expert system, which determined a DoA score as described herein.

At S330, when a potential threat has been detected, at least one mitigation action is performed. The mitigation actions may include, but are not limited to, cleaning traffic, reconfiguring ACLs to prevent direct access to the cloud computing platform hosting the protected applications, or both. In an embodiment, a mitigation action also may include provisioning, configuring or setting the mitigation resource.

In an embodiment, S330 may include causing redirection of traffic from sources of the traffic to a mitigation resource, cleaning the traffic (e.g., by filtering malicious or otherwise illegitimate traffic), and sending cleaned traffic back to protected applications. To this end, in an embodiment, the mitigation resource is a scrubbing center that cleans the traffic by removing malicious traffic and sends the clean traffic to at least one server hosting the at least one protected application. The traffic redirection can be achieved using, for example, DNS redirection, BGP redirection, and the like.

In another embodiment, the mitigation action includes configuration of ACLs in the cloud computing platform to prevent direct access to the protected application, by attackers that are continuously using the IP address of the protected application 160 and not requesting DNS resolutions for the FQDNs of the protected application 160, thereby ensuring that all traffic is directed to the defense platform prior to being redirected to the protected applications. The configuration is performed using, for example, APIs. To this end, the mitigation action may include generating an ACL filtering IP addresses (or a range of IP addresses) not associated with entities in the defense platform, and configuring the cloud computing platform with the generated access control list. Thus, the mitigation action results in only allowing traffic from the defense platform, for example after cleaning by a mitigation resource. In an embodiment, ACLs generation can be performed by the controller 280.

At S340, it is determined whether it is safe to resume peace mode operations and, if so, execution continues with S350, where the traffic is redirected directly to at least one destination server hosting the at least one protected application in a cloud platform rather than being routed through the mitigation resource. Otherwise, execution returns to S330. In an embodiment, S340 includes checking whether a potential DDoS attack is still detected based on indication from the mitigation resources 250 and, if not, determining that it is safe to resume peace mode. It should be noted that continuing execution of the method may allow for, e.g., continuous or otherwise regular monitoring for potential threats as discussed herein above with respect to S310 through S330.

As noted above, in an embodiment, the detection of DDoS attack is performed using at least one detection engine. Accordingly, mitigation resources are deployed, and telemetries are received at, a defense platform located out-of-path of traffic. Specifically, the mitigation resources may be deployed in one or more scrubbing centers in the defense platform, and traffic may be redirected by a controller in the defense platform when a DDoS attack is detected using the at least one detection engine.

It should be noted that FIG. 3 is depicted as performing mitigation actions periodically until it is safe to resume peace mode merely for simplicity purposes and without limitation on the disclosed embodiments. In some implementations, mitigation actions may be performed, for example, upon detection of a threat and then periodically thereafter.

Figure 4:
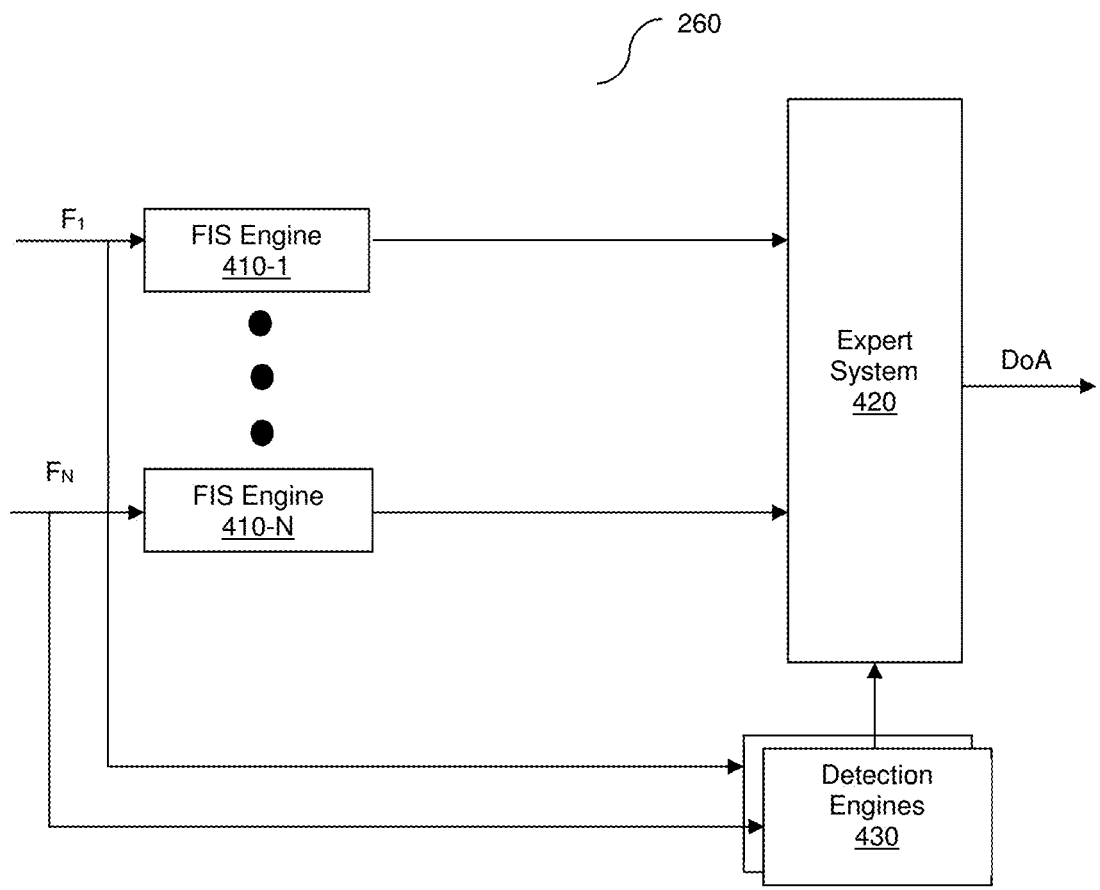
FIG. 4 is a block diagram illustrating detection by a detector according to an embodiment.

FIG. 4 shows an example block diagram illustrating detection by the detector 260 according to an embodiment. The detector 260 includes FIS engines 410-1 through 410-N (hereinafter referred to individually as a FIS engine 410 or collectively as FIS engines 410, merely for simplicity purposes), each of which may be configured as discussed herein with respect to FIG. 6. Each FIS engine 410 determines if values of a respective feature demonstrates normal or abnormal behavior. To this end, each FIS engine 410 outputs a set of degree of fulfillment (DoF) scores. Each DoF score indicates the behavior group to which the observed features belong and feeds the determined DoF score to an expert system 420. The behavior groups may include, but are not limited to, normal, suspicious, and attack.

The detector 260 also optionally includes one or more detection engines 430. In an embodiment, each detection engine 430 operates as a single-dimension detector based on a single feature and its on-going calculated normal baseline level.

Figure 5:
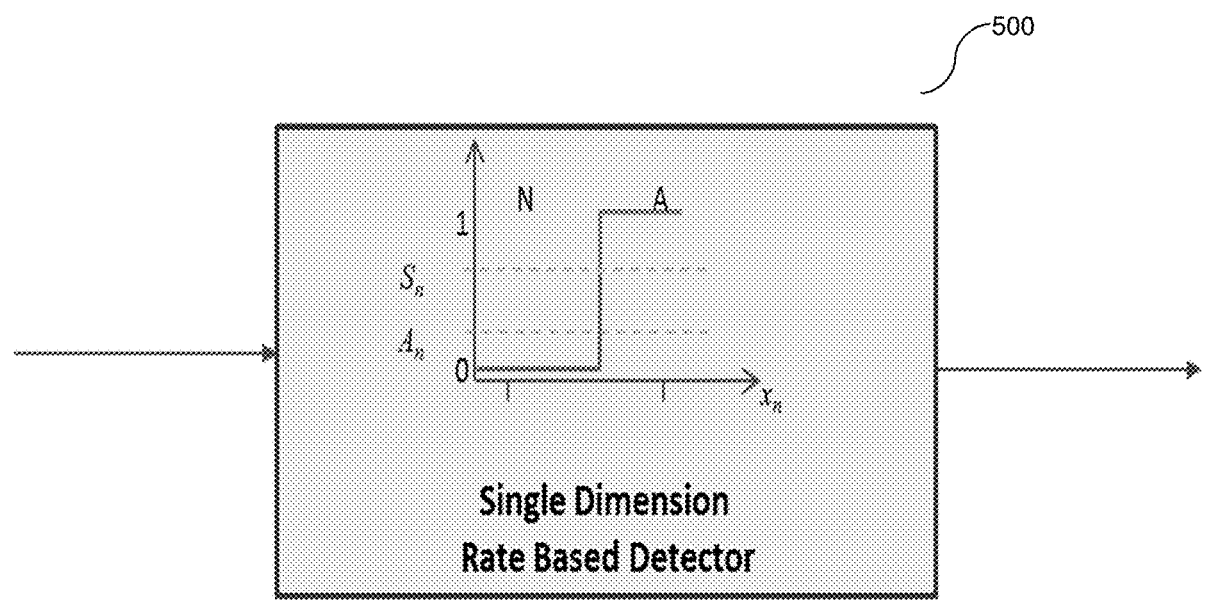
FIG. 5 is a simulation illustrating a single-dimension detection.

As illustrated in the example simulation 500 shown in FIG. 5, in a single dimension detection, a feature value is validated against one or more normal baseline levels. Detection is based on exceeding the baseline levels for a certain amount of time. To this end, the detection engine 430 may be configured to automatically compute the normal baseline levels based on monitored features (e.g., over a specified time period, such as the last day, week, or month, on an hourly basis), where potential DDoS attacks are detected based on deviations from the normal baseline levels. In an embodiment, the baseline levels may include high and low levels such that an attack is detected as starting once the high levels has been surpassed for a predetermined period of time and as ending once the telemetric value falls below the low level for a predetermined period of time. Deviation from the baseline can be manually defined as a percentage (or by others) or can be automatically set, for example as 4 times the standard deviation.

Returning to FIG. 4, the expert system 420 is configured to determine a degree of attack (DoA) score based in part on the DoF scores fed from the FIS engines 410. As noted above, each FIS engine 410 operates on a respective feature Fi through FN and outputs a set of DoF scores representing normal, suspicious, and attack activity. Thus, the expert system 420 is configured to perform at least a multiple dimension detection based on the outputs of the FIS engines 410.

The determined DoA is compared to a predefined threshold, where any DoA score exceeding this threshold would trigger an alert or a signal that a DDoS attack has been detected. In an optional embodiment, inputs fed from the detection engines 430 are also considered by the expert system 420 if and when an alert is triggered. In an alternative embodiment, only inputs from the FIS engines 410 are considered. Alternatively, or collectively, the inputs from the detection engines 430 may be utilized for the detections. Such inputs would be triggered upon crossing one or more normal baseline levels. It should be appreciated that in some embodiments, one, some, or all of the features can be considered in the DoA determination.

Therefore, by implementing the disclosed embodiments, the detector 260 provides an out-of-path (OOP) detection of attacks committed against protected cloud applications hosted in a multi-cloud architecture against DDoS attacks.

In an embodiment, the detector 260 can be utilized to detect L7 flood DDoS attacks. The detection of flood DDoS attacks may be based on features such as, but not limited to, a request rate (request per second (RPS), which is a rate-based feature), and an average request size (ARS) (which is a rate-invariant feature). Example techniques for detecting and mitigating flood type DDoS attacks for cloud-hosted applications are described further in the above-noted U.S. patent application Ser. No. 15/6,685,484, the contents of which are hereby incorporated by reference.

In another embodiment, the detector 260 can be utilized to detect slow application layer DDoS attacks. The detection of slow application layer DDoS attacks may be based on features such as, but not limited to, new connections per second (NCPS); connections per second (CPS); and average connection size (ACS). Example techniques for detecting and mitigating slow application layer DDoS attacks are described further in U.S. patent application Ser. No. 15/657,499, assigned to the common assignee, the contents of which are hereby incorporated by reference.

In another embodiment, the detector 260 can be utilized to detect L3-L4 network layer floods DDoS attacks. The detection of network layer flood DDoS attacks may be based on features such as, but not limited to, number of packets and bytes per seconds of TCP, UDP, ICMP and other IP traffic; number of SYN or other flags of TCP; and so on.

Figure 7:
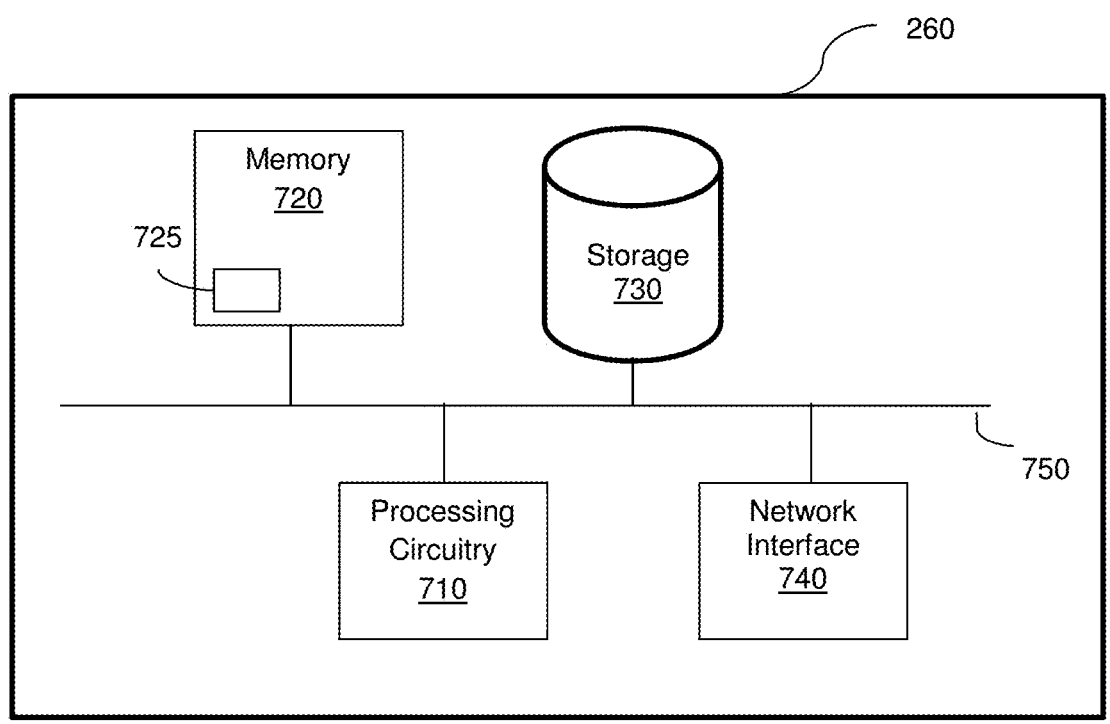
FIG. 7 is a schematic diagram of a detector according to an embodiment.

The various elements of the detector 260 as illustrated in FIG. 4 can be realized using one or more processing circuitries as shown, for example, in FIG. 7.

FIG. 7 is an example block diagram of the detector 260 according to an embodiment. The detector 260 includes a processing circuitry 710 coupled to a memory 720, a storage 730, and a network interface 740. In an embodiment, the components of the detector 260 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof. In one configuration, computer readable instructions to implement one or more embodiments disclosed herein may be stored in the storage 730.

In another embodiment, the memory 720 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 710 to perform out-of-path detection and mitigation of cyber-attacks, as discussed hereinabove. In a further embodiment, the memory 720 may further include a memory portion 725 including the instructions.

The storage 730 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 730 may store communication consumption patterns associated with one or more communications devices.

The network interface 740 allows the detector 260 to communicate with the monitoring system 235 in order to receive telemetries and alerts related to traffic behavior. The network interface 840 further allows the detector 260 to communicate with the CDN 220 and the mitigation resource 250 for purposes of redirecting traffic from the CDN 220 to the mitigation resource 250.

It should be understood that the embodiments described herein are not limited to the specific architecture illustrated in FIG. 7, and that other architectures may be equally used without departing from the scope of the disclosed embodiments.

It should be further noted that the controller 280 and the mitigation resource 250 may be realized using a computing architecture, similar to the architecture illustrated in FIG. 7, and that other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A defense platform for protecting a cloud-hosted application against distributed denial-of-services (DDoS) attacks, wherein the defense platform is deployed out-of-path of incoming traffic of the cloud-hosted application, wherein the cloud-hosted application is hosted in a plurality of cloud computing platforms, comprising:
   a detector;
   a mitigator; and
   a controller communicatively connected to the detector and the mitigator;
   wherein the detector is configured to:
      receive telemetries from a plurality of sources deployed in the plurality of cloud computing platforms, wherein the collected telemetries relate to behavior of the cloud-hosted application; and
      detect, based on the received telemetries, a potential DDoS attack against the cloud-hosted application;
   wherein, the controller, upon detection of a potential DDoS attack against the cloud-hosted application, is configured to:
      divert traffic directed to the cloud-hosted application to the mitigator;
      cause the mitigator to perform at least one mitigation action to remove malicious traffic from the diverted traffic; and
      cause injection of clean traffic to at least one of the plurality of cloud computing platforms hosting the cloud-hosted application;
   wherein at least two of the cloud computing platforms of the plurality of cloud computing platforms are each provided by a different provider;
   wherein the clean traffic is injected back to the at least one of the plurality of cloud computing platforms; and
   wherein the controller is further configured to cause periodic domain name system queries to be issued to dynamically learn and update an Internet Protocol address of the cloud-hosted application in the plurality of cloud computing platforms to which cleaned traffic should be returned.

2. The defense platform of claim 1, wherein the detector is further configured to:
   provide a set of rate-based and rate-invariant features based on the collected telemetries; and
   evaluate each feature in the set of rate-based and rate-invariant features to determine whether a behavior of each feature and a behavior of the set of rate-based and rate-invariant features indicate the potential DDoS attack against the cloud-hosted application.

3. The defense platform of claim 2, wherein the evaluation of each feature includes comparing a value of the feature to a learned baseline.

4. The defense platform of claim 2, wherein the detector includes a plurality of fuzzy logic inference system (FIS) engines configured to determine if each feature and a behavior of the set of rate-based and rate-invariant features indicate a potential DDoS attack based on outputs of the FIS engines.

5. The defense platform of claim 1, further comprising:
   an application delivery controller (ADC), wherein the ADC is configured to perform the injection of the clean traffic back to the at least one of the plurality of cloud computing platforms and wherein the controller causes the periodic domain name system queries to be issued by the ADC to dynamically learn and update the Internet Protocol address of the cloud-hosted application in the plurality of cloud computing platforms to which cleaned traffic should be returned.

6. The defense platform of claim 1, wherein the telemetries received by the detector further include telemetries collected from at least one source deployed in an on-premises datacenter hosting at least one application.

7. The defense platform of claim 6, wherein at least one of the plurality of cloud computing platforms is a datacenter.

8. The defense platform of claim 1, wherein the defense platform is integrated in one of the plurality of cloud computing platforms.

9. The defense platform of claim 1, wherein the defense platform is a stand-alone cloud computing platform that does not host the cloud-hosted application.

10. The defense platform of claim 1, wherein the received telemetries include at least one of: a latency, a new transmission control protocol (TCP) connection count, an active TCP connection count, application-layer hypertext transfer protocol (HTTP) methods counts, application-layer verbs counts, application-layer request counts, memory usage, transaction volume, a connection size, a session size, an error rate, a number of HTTP methods requests originating from all end-user devices currently accessing the cloud-hosted application, and a number of processed bytes of HTTP traffic directed to the cloud-hosted application.

11. The defense platform of claim 1, wherein the received telemetries include at least one of: transmission control protocol (TCP) byte count, TCP packet count, user datagram protocol (UDP) byte count, UDP packet count, Internet control message protocol (ICMP) byte count, ICMP packet count and number of SYN flags.

12. The defense platform of claim 1, wherein the potential DDoS attack is any one of: a layer-7 flood DDoS attack, and a layer-3 to layer-4 flood DDoS attack.

13. The defense platform of claim 12, wherein the set of rate-based and rate-invariant features includes a rate-based feature of a number of hypertext transfer protocol (HTTP) requests per second (RPS) directed to the cloud-hosted application and a rate-invariant feature of an average size of HTTP requests directed to the cloud-hosted application.

14. The defense platform of claim 1, wherein the potential DDoS attack is a layer-7 slow application-layer DDoS attack.

15. The defense platform of claim 14, wherein the set of rate-based and rate-invariant features includes a number of new connections per second, a number of connections per second, and an average connection size.

16. The defense platform of claim 1, wherein at least a portion of the telemetries are received from a plurality of content delivery networks (CDNs), wherein each CDN is deployed in-path between one of the plurality of cloud computing platforms and a plurality of end user devices.

17. The defense platform of claim 16, wherein the controller is further configured to:
cause redirection of traffic directed at each CDN to the defense platform when a potential DDoS attack is determined.

18. The defense platform of claim 1, wherein the traffic direction by the controller includes causing a domain name system (DNS) diversion to the defense platform.

19. The defense platform of claim 18, wherein causing the DNS diversion includes dynamically updating at least one CNAME in at least one DNS server in order to redirect traffic to the defense platform.

20. The defense platform of claim 18, wherein the controller is further configured to:
signal a detected attack to the mitigator when a potential DDoS attack is detected.

21. The defense platform of claim 1, wherein the controller is further configured to terminate the traffic diversion when the potential DDoS attack is terminated.

22. The defense platform of claim 1, wherein the at least one mitigation action includes generating an access control list (ACL) and configuring at least one of the plurality of cloud computing platforms with the generated ACL.

23. The defense platform of claim 22, wherein the generated ACL only allows traffic from the defense platform.

24. The defense platform of claim 1, wherein the defense platform is not among the plurality of cloud computing platforms.

25. The defense platform of claim 1, wherein the plurality of sources from which the telemetries are received include at least one of: a cloud monitoring platform, an application performance monitoring system, and a source of operating system level telemetries.

26. The defense platform of claim 1, wherein the cloud-hosted application is hosted across a combination of at least two of the plurality of cloud computing platforms.

27. The defense platform of claim 1, wherein telemetries are only metric data derived from the incoming traffic of the cloud-hosted application but is not the incoming traffic itself.

* * * * *